Dec. 3, 1940. M. HOKANSON Re. 21,646

REFRIGERATOR

Original Filed Sept. 10, 1934

Inventor:
Martin Hokanson
Attorney

Reissued Dec. 3, 1940

Re. 21,646

UNITED STATES PATENT OFFICE 21,646

REFRIGERATOR

Martin Hokanson, Duluth, Minn., assignor to Eidco, Inc., Duluth, Minn., a corporation of Minnesota Original No. 2,069,149, dated January 26, 1937, Serial No. 743,395, September 10, 1934. Application for reissue December 3, 1938, Serial No. 243,795

9 Claims. (Cl. 62—31)

This invention relates to refrigerators and has special reference to the arrangement of the interior parts of the refrigerator, the principal object being to materially improve the preserving properties of perishable commodities thereof by arranging such parts to provide and assure a continuous convective circulation of air between the refrigerant chamber and the food compartment and to provide novel facilities for expediting the cleansing of such a refrigerator.

Another object is to provide means within the refrigerator for maintaining uniform moisture content of the air within the refrigerator.

A further object is to provide a shallow space below the lowermost food shelf and to provide means which acts as a baffle at the door and prevents the cold air from readily escaping from the refrigerator when the door is open, and also makes it impossible for foodstuffs within the refrigerator to obstruct the circulation of air therein.

Still other objects and advantages of the invention will appear in the following description thereof.

The refrigerator described herein is an improvement upon the refrigerator disclosed in my Patent No. 2,061,155 of November 17, 1936.

Referring now to the accompanying drawing, forming part of this application, and wherein like reference characters indicate like parts:

Figure 1:
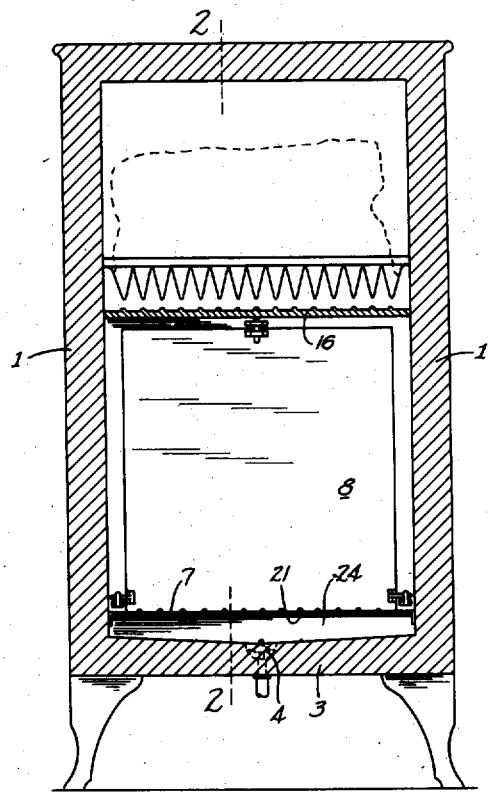
Fig. 1 is a transverse vertical section through the bottom portion of a refrigerator, but forwardly of the drain pipe thereof.
Figure 2:
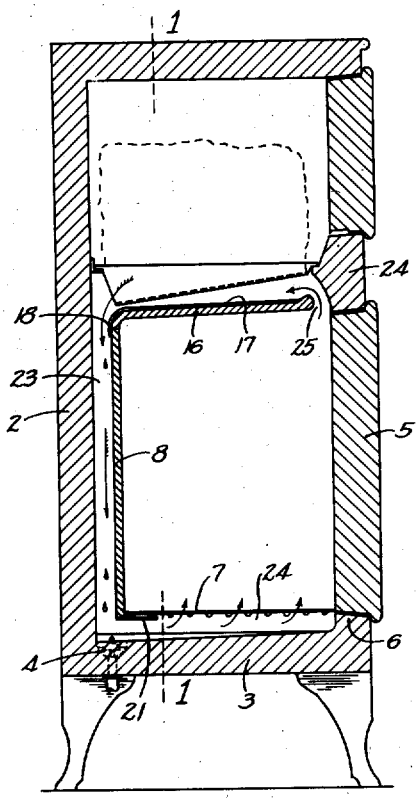
Fig. 2 is a similar view taken at right angles to Fig. 1 and in close proximity to the drain pipe.
Figure 3:
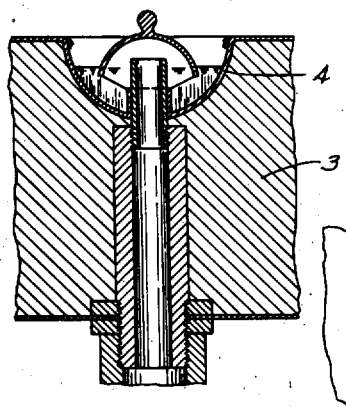
Fig. 3 is an enlarged central sectional view of the drain pipe connection and trap therefor.
Figure 4:
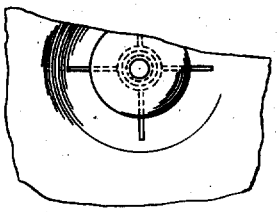
Fig. 4 is a fragmental top plan view of Fig. 3 illustrating the construction of the trap.

Numeral 1 represents the side walls of the refrigerator, 2 the back, and 3 the bottom thereof, while 24 is a portion of the front wall and 5 the food compartment door. The bottom wall 3 is inclined from the front thereof rearwardly and has provided therein centrally and at the rearmost edge the water seal 4. At the forward edge of the bottom, transverse the doorway, an upwardly extending threshold 6 is formed substantially flush with the top of the pervious shelf 7 to prevent foodstuffs in the refrigerator from closing the drip space 23 and thereby preventing convective circulation of air and to prevent cooled air from escaping from the refrigerator when the door 5 is open. One novel feature of the invention is that a pervious or foraminous bottom shelf is provided in spaced relation to the floor 3 to provide the space 24 and so that its front end terminates on a level with the threshold 6, and that where it contacts the back wall 8 of the food compartment it is provided with an impervious to splashing portion or strip 21 parallel with and just in front of the back wall 8. This impervious strip 21 is for the express purpose of preventing the splashing of water which drips downwardly in the drip compartment of space 23 intermediate of the back wall 8 and the back wall 2 of the refrigerator, as it is well known that this drip in some instances becomes quite objectionable in splashing onto food or other objects in the food compartment of the refrigerator and by this means such annoyance is wholly eliminated. This impervious portion may be a fine screen of metal, or an independent thin sheet of material.

Figure 5:
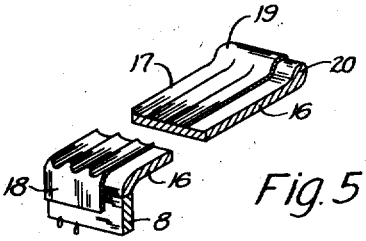
Fig. 5 is a broken perspective view partly in section of the drip pan.

At the upper end of the food compartment is installed the inclined drip pan or partition 16 covered with a corrugated sheet of metal, as shown at 17, and which is deemed novel and advantageous in that it is flattened at both ends, that is the corrugations stop short of either end and at the lower end it is turned down vertically and overlaps the inner upper edge of the wall 8, as at 18, so as to drip clear of said wall into the drip space as clearly seen in Fig. 5 of the drawing, while the opposite flattened end 19 of the cover 17 overlaps the upwardly extending bead 20, thus making a simple and efficient drip pan which remains uniformly damp and moist, and drips freely into the drip space.

In operation the air cooled by a refrigerant in the refrigerant chamber moves down the inclined drip pan 16 into the vertical space or flue 23 associated with a vertical wall of the refrigerator and thence into the space 24 below the pervious shelf 7 by which it is distributed throughout the food compartment, and being warmed by the foodstuffs therein, rises through the inlet 25 to above the drip pan where it is again cooled and repeats the cycle. At the same time the water of condensation and of melted refrigerant is directed by the inclined drip pan 16 into the space or flue 23 associated with said vertical wall and while falling in said flue 23 further cools the circulating air, accelerates the movement of the circulating air and also humidifies the circulating air.

The accompanying drawing illustrates the preferred form of the invention, though it is to be understood that the invention is not limited to the exact details of construction shown and described, as it is obvious that various modifications thereof, within the scope of the claims, will occur to persons skilled in the art.

Having thus described my invention, what I claim and desire to secure by Letters Patent, is:

I claim:

1. Means for increasing the humidity in the circulating air of a refrigerator having a drip compartment therein, comprising an inclined drip pan above said food compartment and dripping into said drip compartment, a flat scalloped lowermost terminus to said pan whereby to evenly distribute the drip from the pan below the ice, laterally into said drip compartment, and means adjacent the bottom of the drip compartment to prevent drip water splashing into the food compartment, said means being located so as not to interfere with air circulation within said refrigerator.

2. In a refrigerator, a food compartment characterized by the back wall and bottom of the food compartment being spaced respectively from the back wall and bottom of the refrigerator, the space between said bottoms being substantially not less than the space between said back walls, thereby forming an unobstructed space for the flow of air between said back walls and bottoms towards the food compartment, a drip pan having means projecting into the space between said back walls to convey drip from a refrigerant into said space so that it will fall to the bottom of the refrigerator, a portion of the bottom of the food compartment adjacent the back wall thereof being so formed as to prevent splashing of water therethrough from the rear bottom section of the refrigerator.

3. A drip pan for refrigerators adapted to be placed beneath an ice rack therein and receive the drip therefrom and conduct it toward a drain, characterized by having an upper lined surface which is corrugated intermediate its ends, one end thereof being bent downwardly over one end of the pan and the other end of said lining overlapping and being rabbeted into the other end of said pan.

4. In a refrigerator having a food compartment having an open bottom, a wall of which is spaced from a wall of the refrigerator forming an unobstructed drip space therebetween extending to the bottom of the refrigerator, a drip pan having means at the top of said compartment and projecting into the top of said space across the same to cause drip from a refrigerant to fall into the top of said space and thence to the bottom of the refrigerator, and means at the bottom corner of the food compartment adjacent the drip space to prevent the drip from splashing into the food compartment.

5. A refrigerator comprising an enclosure having a pair of oppositely disposed walls, one of the walls of said enclosure having a door opening therein, said enclosure including a food storage space, a baffle forming a wall of said food storage space and cooperating with the other of said pair of oppositely disposed walls to provide a flue, a drip pan forming the upper wall of said food storage space and arranged obliquely with respect to the floor of said enclosure and extending upward to a point adjacent said door opening, said drip pan being arranged to cooperate with an overhead ice holder to provide an air cooling passage and to direct the drip from the ice into said flue, a threshold extending upwardly from the floor of said enclosure and constituting one of the walls of said door opening, a foraminous shelf extending from the top of said threshold to the baffle and arranged to prevent the placing of food stuffs in position to obstruct the discharge of air from said flue, said baffle extending below the top of said foraminous shelf, and the inlet to said air cooling passage being disposed obliquely opposite to the outlet from said flue, whereby the air discharged from said flue passes through said foraminous shelf and across the articles arranged thereon and ascends to the inlet of said air cooling passage and flows downwardly therefrom into said flue.

6. A refrigerator provided with a food compartment and a refrigerant space vertically above the food compartment; means constituting a drip space associated with a vertical wall of the refrigerator; a drip pan, one edge of which extends to the upper end of the drip space, an opening being provided at the opposite edge thereof between the food compartment and the refrigerant space at a higher level than the opening into the drip space; and a pervious structure forming the bottom of the food compartment and arranged adjacent the bottom of the refrigerator, one edge of which extends to the lower end of said drip space to provide an air circulation space under the pervious structure communicating with said drip space, whereby circulation of air is provided for from the refrigerant space through the drip space, said air circulation space, said pervious structure, and upwardly and laterally through the food compartment back to the refrigerant space and whereby the circulated air is cooled and humidified by water from the refrigerant space, and means to prevent water adjacent the lower end of said drip space from splashing into the food compartment.

7. A refrigerator provided with a food compartment and a refrigerant space vertically above the food compartment; means constituting a drip space associated with a vertical wall of the refrigerator; a drip pan, one edge of which extends to the upper end of the drip space, an opening being provided at the opposite edge thereof between the food compartment and the refrigerant space at a higher level than the opening into the drip space; and a pervious structure forming the bottom of the food compartment and arranged adjacent the bottom of the refrigerator, one edge of which extends to the lower end of said drip space to provide an air circulation space under the pervious structure communicating with said drip space, whereby circulation of air is provided for from the refrigerant space through the drip space, said air circulation space, said pervious structure, and upwardly and laterally through the food compartment back to the refrigerant space and whereby the circulated air is cooled and humidified by water from the refrigerant space, and means for trapping water at the bottom of the drip space and means for preventing such trapped water from splashing into the food compartment.

8. A refrigerator comprising a wall structure arranged to define a food storage compartment and a flue, a drip pan forming part of said wall structure at the upper part of the storage compartment and arranged obliquely with respect to the floor of said compartment, said drip pan being disposed to cooperate with an overhead ice holder to provide an air cooling passage and to direct melted ice from said holder into said flue, a foraminous rack arranged adjacent the floor of said compartment and extending from said flue toward the center of the compartment, said flue terminating near the plane of the top of said rack, and the inlet to said air cooling passage being so disposed with respect to the outlet from said flue that the air discharged from said flue passes through said foraminous rack and across the articles arranged thereon and ascends to the inlet of said air cooling passage and flows downwardly therefrom into said flue.

9. A refrigerator comprising a wall structure arranged to define a food storage compartment and a flue, a drip pan forming part of said wall structure at the upper part of the storage compartment and arranged obliquely with respect to the floor of said compartment, said drip pan being disposed to cooperate with an overhead ice holder to provide an air cooling passage, a foraminous rack arranged adjacent the floor of said compartment and extending from said flue toward the center of the compartment, said flue terminating near the plane of the top of said rack, and the inlet to said air cooling passage being so disposed with respect to the outlet from said flue that the air discharged from said flue passes through said foraminous rack and across the articles arranged thereon and ascends to the inlet of said air cooling passage and flows downwardly therefrom into said flue.

MARTIN HOKANSON.